(12) United States Patent
Todd et al.

(10) Patent No.: US 10,783,291 B2
(45) Date of Patent: Sep. 22, 2020

(54) HYBRID PERFORMANCE OF ELECTRONIC DESIGN AUTOMATION (EDA) PROCEDURES WITH DELAYED ACQUISITION OF REMOTE RESOURCES

(71) Applicant: Mentor Graphics Corporation, Wilsonville, OR (US)

(72) Inventors: Robert A. Todd, Beaverton, OR (US); Laurence W. Grodd, Santa Rosa Beach, FL (US); Jimmy J. Tomblin, Santa Rosa Beach, FL (US); Patrick D. Gibson, Tualatin, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 16/240,185

(22) Filed: Jan. 4, 2019

(65) Prior Publication Data
US 2020/0218788 A1 Jul. 9, 2020

(51) Int. Cl.
*G06F 30/00* (2020.01)
*G06F 30/30* (2020.01)
*G06F 9/54* (2006.01)
*G06F 9/50* (2006.01)

(52) U.S. Cl.
CPC ............ *G06F 30/30* (2020.01); *G06F 9/5044* (2013.01); *G06F 9/5055* (2013.01); *G06F 9/542* (2013.01)

(58) Field of Classification Search
CPC ...... G06F 30/30; G06F 9/5044; G06F 9/5055; G06F 9/542
USPC ......................................................... 716/101
See application file for complete search history.

(56) References Cited

U.S. PATENT DOCUMENTS

| 6,594,799 B1* | 7/2003 | Robertson ............... G06F 30/30 716/100 |
| 2002/0188910 A1* | 12/2002 | Zizzo ...................... G06F 30/30 716/103 |
| 2009/0106008 A1 | 4/2009 | Branson et al. |
| 2011/0246653 A1 | 10/2011 | Balasubramanian et al. |
| 2019/0102489 A1* | 4/2019 | Chawda .................. G06F 30/33 |
| 2019/0146847 A1* | 5/2019 | Gibson ................ G06F 9/5044 718/104 |

(Continued)

OTHER PUBLICATIONS

Amazon: "Optimizing Electronic Design Automation (EDA) Workflows on AWS"; Amazon Web Services; Sep. 1, 2018; pp. 1-55; XP055654403; Retrieved from Internet: URL: https://dl.awsstatic.com/HPC2019/optimizing-electronic-design-automation-eda-workflows-on-aws.pdf.

*Primary Examiner* — Suchin Parihar

(57) ABSTRACT

A computing system may include an electronic design automation (EDA) data constructor engine and an EDA executor engine. The EDA data constructor engine may be configured to perform, using the local resources of the computing system, a data preparation phase of an EDA procedure for a circuit design. The EDA executor engine may be configured to acquire remote resources for an execution phase of the EDA procedure, wherein the remote resources include remote compute resources and remote data resources remote to the computing system; broadcast constructor data constructed from the data preparation phase of the EDA procedure to the acquired remote data resources; and manage performance of the execution phase of the EDA procedure by the acquired remote compute resources and remote data resources.

20 Claims, 5 Drawing Sheets

(56) References Cited

U.S. PATENT DOCUMENTS

2019/0171365 A1* 6/2019 Power .................. G06F 3/0649
2019/0347138 A1* 11/2019 Gibson ............... H04L 67/2809
2019/0361425 A1* 11/2019 Pikus .................. G03F 7/70466

* cited by examiner

HYBRID PERFORMANCE OF ELECTRONIC DESIGN AUTOMATION (EDA) PROCEDURES WITH DELAYED ACQUISITION OF REMOTE RESOURCES

BACKGROUND

Electronic circuits, such as integrated microcircuits, are used in nearly every facet of modern society from automobiles to microwaves to personal computers. Design of microcircuits may involve many steps, known as a "design flow." The particular steps of a design flow are often dependent upon the type of microcircuit being designed, its complexity, the design team, and the microcircuit fabricator or foundry that will manufacture the microcircuit. Electronic design automation (EDA) applications support the design and verification of circuits prior to fabrication. EDA applications may implement various EDA procedures, e.g., functions, tools, or features to analyze, test, or verify a design at various stages of the design flow.

BRIEF DESCRIPTION OF THE DRAWINGS

Certain examples are described in the following detailed description and in reference to the drawings.

DETAILED DESCRIPTION

The following disclosure relates to EDA applications and computer-aided design (CAD) systems which may be used to facilitate the design and manufacture of circuits. As technology improves, modern circuit designs may include billions of components or more. To support increasing degrees of circuit complexity, EDA applications may provide circuit analysis, test, design, or verification capabilities through EDA procedures. EDA procedures may refer to any sequence of EDA operations (or a set of multiple operation sequences) that analyze, test, verify, or design a circuit design. Examples of EDA procedures include high-level synthesis processes, schematic captures, transistor or logic simulations, field solvers, functional and physical verifications, geometry processing, equivalence checking, design rule checks, mask data preparation, optical proximity corrections, layout-versus-schematic analyses, and more. These various EDA procedures may be performed via EDA applications or other CAD analysis tools.

The features described herein may support hybrid performance of EDA procedures with delayed acquisition of remote resources. In particular, the various EDA hybrid performance features described herein may provide capabilities to perform different phases of an EDA procedure with differing resources, and thus a "hybrid" execution instead of a "static" execution in which a static set resources for the EDA procedure are procured prior to execution. In some examples, EDA hybrid performance features are provided through performance of a data preparation phase via local data resources, delaying acquisition of remote computing and data resources to perform an execution phase of the EDA procedure. In doing so, the EDA hybrid performance features described herein may support increased computational efficiency and improved resource utilization as compared to static resource reservation techniques.

These and other EDA hybrid performance features and technical benefits are described in greater detail herein.

Figure 1:
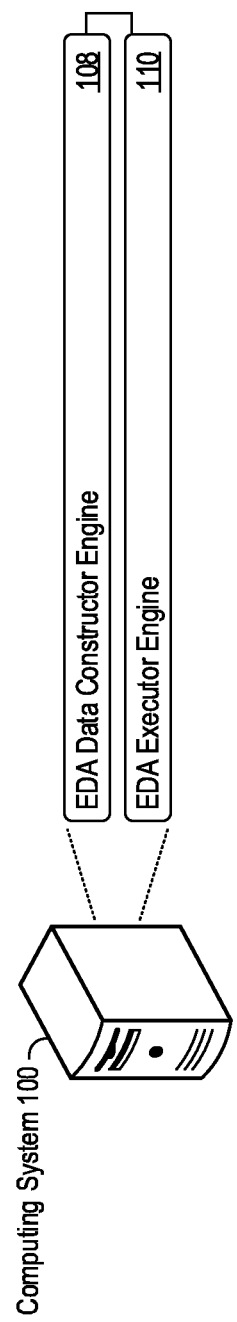
FIG. 1 shows an example of a computing system that supports hybrid performance of EDA procedures with delayed acquisition of remote resources.

FIG. 1 shows an example of a computing system 100 that supports hybrid performance of EDA procedures with delayed acquisition of remote resources. The computing system 100 may include a single or multiple computing devices such as application servers, compute nodes, data servers, desktop or laptop computers, smart phones or other mobile devices, tablet devices, embedded controllers, and more. In some implementations, the computing system 100 takes the form of a single computing device, such as a laptop, workstation, desktop computer, compute node, or server.

As described in greater detail herein, the computing system 100 may selectively acquire resources for different phases of an EDA procedure. By using different resources for different phases (e.g., delayed remote resource acquisition for later phases in the execution order of the EDA process), the computing system 100 may leverage differing computational and data requirements for different phases of the EDA procedure to improve resource utilization. In particular, the computing system 100 may apply the EDA hybrid performance features described herein specifically for data preparation phases and execution phases of EDA procedures. A data preparation phase of an EDA procedure may involve data processing of a circuit design to support further analysis, and may thus require relatively more data resources (and relatively less compute resources) as compared to a subsequent execution phase of an EDA procedure. In delaying remote resource acquisition for the execution phase (and limiting resource usage for the data preparation phase to local resources), the computing system 100 need not reserve remote compute resources during the data preparation phase during which such remote compute resources may go unused or underutilized.

To implement any of the various EDA hybrid performance features described herein, the computing system 100 may include an EDA data constructor engine 108 and an EDA executor engine 110.

The computing system 100 may implement the EDA data constructor engine 108 and EDA executor engine 110 (and components thereof) in various ways, for example as hardware and programming implemented via local resources of the computing system 100. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engine components or system elements using the same computing system features or hardware components (e.g., a common processor or common storage medium for the EDA data constructor engine 108 and the EDA executor engine 110). In some implementations, the computing system 100 implements the EDA data constructor engine 108 and the EDA executor engine 110, at least in in part, as different computing processes (e.g., different UNIX processes).

In operation, the EDA data constructor engine 108 may perform, using local resources of the computing system 100, a data preparation phase of an EDA procedure for a circuit design. In operation, the EDA executor engine 110 may determine that the EDA data constructor engine 108 has completed the data preparation phase of the EDA procedure, and responsive to the determination, acquire remote resources for an execution phase of the EDA procedure. The acquired remote resources may include remote compute resources and remote data resources that are remote (e.g., physically or logically separate to the computing system 100). Also, the EDA executor engine 110 may broadcast constructor data, constructed from the data preparation phase of the EDA procedure, to the acquired remote data resources and manage performance of the execution phase of the EDA procedure by the acquired remote compute resources and remote data resources.

Examples of EDA hybrid performance features are described in greater detail next with regards to the data preparation and execution phases of EDA procedures. However, any of the EDA hybrid performance features described herein may be consistently applied for additional or alternative phases of an EDA procedure that vary in computational or data requirements.

Figure 2:
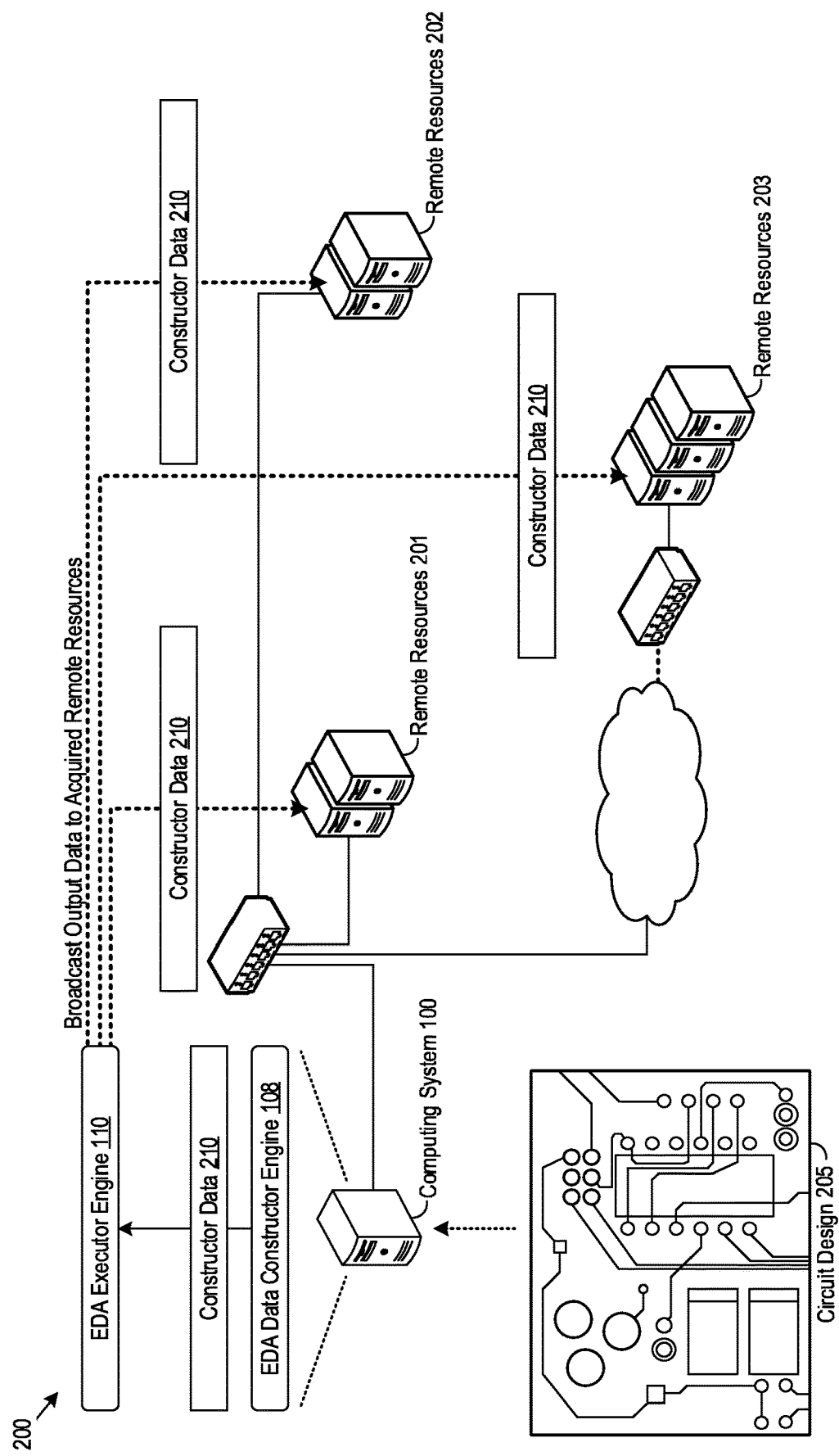
FIG. 2 shows an example of a computing environment that supports hybrid performance of EDA procedures with delayed acquisition of remote resources.

FIG. 2 shows an example of a computing environment 200 that supports hybrid performance of EDA procedures with delayed acquisition of remote resources. The computing environment 200 includes a computing system 100 (that implements an EDA data constructor engine 108 and EDA executor engine 110) as well as remote resources 201, 202, and 203. The remote resources 201, 202, and 203 may be separate physical devices from the computing system 100, e.g., other computing nodes in a distributed computing environment configured for execution of EDA applications. In the computing environment 200 shown in FIG. 2, for example, the remote resources 201 and 202 are illustrated as separate computing devices from the computing system 100 interlinked via a local area network (LAN), whereas the remote resources 203 are illustrated as interconnected to the computing system 100 via an external communication network (e.g., the Internet).

EDA applications and procedures may be executed in various types of computing environments, including in whole or in part via cloud computing. As such, the computing environment 200 (including the computing system 100 and the remote resources 201, 202, and 203) may be implemented in part via a public cloud, private cloud, or hybrid cloud. Additionally or alternatively, EDA applications may be executed via a software-as-a-service ("SaaS") distribution model (whether in whole or in part), and the compute resources that comprise the computing environment 200 may be off-premise (e.g., with regards to EDA application users), on-premise, or a combination of both. Any of the various EDA features described herein may be implemented as part of a SaaS distribution model or via cloud computing implementations.

In the computing environment 200, the computing system 100 may serve as a "master" entity (e.g., master device or master machine) that directs performance of an EDA procedure. For instance, the computing system 100 may be a workstation through which users can interface with an EDA application to execute EDA design or analysis commands, and the computing system 100 may access or reserve additional compute or data resources for the EDA application. Additionally or alternatively, the computing system 100 may launch, host, implement, or otherwise execute a parent computing process for an EDA procedure that controls various aspects of EDA procedure performance. In some implementations (and as a continuing illustration herein), the computing system 100 launches a parent (or master) computing process for an EDA procedure via the EDA executor engine 110. In that regard, the EDA executor engine 110 may manage performance of the EDA procedure by acquiring resources for performance of the EDA procedure, assigning EDA operations to acquired resources, executing various portions of the EDA procedure itself, or in other ways.

To support EDA hybrid performance, the EDA executor engine 110 may allot different resources for performance of the data preparation phase and the execution phase of an EDA procedure. The data preparation phase of an EDA procedure may include any data pre-processing to support subsequent circuit analysis, test, verification, or design operations of an EDA procedure. For instance, the data preparation phase may include formatting circuit design data into specific data formats or constructing specific circuit data structures in support of subsequent circuit analysis, test, verification, or design. In some examples, the data preparation phase may include construction of circuit representations in a hierarchical format, such as a hierarchical dataset.

A hierarchical dataset may take the form of any hierarchical representation of a circuit design. In that regard, the hierarchical dataset (which may be in the form of a hierarchical database) may include various hierarchies in circuit representation to provide computational efficiencies for subsequent circuit analyses. Hierarchies in the hierarchical dataset may include hierarchies of design elements (e.g., combination of individual circuit structures into larger circuit structures), of stacking order of individual layers in an integrated circuit, or in other hierarchical forms.

In some instances, a hierarchical dataset may include various design cells that represent the circuit layout in a cell-based hierarchical structure. Hierarchical cells may encapsulate individual design structures (e.g., electrode contacts) which can be grouped to form other hierarchical cells (e.g., NAND gates) on a higher hierarchical layer, which may be further grouped into other hierarchical cells on yet other higher hierarchical layers. In such a way, the hierarchical dataset may represent various design hierarchies in a circuit layout. Such hierarchical structures may support parallelism and operational-level concurrency for performance of EDA procedures.

The EDA executor engine 110 may limit performance of the data preparation phase of an EDA procedure specifically to local resources of the computing system 100. In some implementations, the EDA executor engine 110 may initiate a computing process to perform the data preparation phase of the EDA procedure and assign only local resources of the computing system 100 to the initiated computing process. The EDA data constructor engine 108 may, in some examples, implement the computing process initiated by the EDA executor engine 110 to perform the data preparation phase of the EDA procedure. In initiating (e.g., launching) the EDA data constructor engine 108, the EDA executor engine 110 may acquire and allocate only local resources of the computing engine 110 to the EDA data constructor engine 108, e.g., without acquiring or assigning any compute or data resources of the remote resources 201, 202, or 203 (or any other remote resources) for the data preparation phase.

In the example shown in FIG. 2, the EDA data constructor engine 108 accesses and processes the circuit design 205 as part of the data preparation phase of an EDA procedure. In doing so, the EDA data constructor engine 108 may perform the EDA preparation phase for the circuit design 205 using (only) local compute and data resources of the computing system 100. By limiting performance of the data preparation phase to local memories of the computing system 100 (e.g., local device RAM), remote resources (e.g., remote RAM of the remote resources 201, 202, or 203) are not acquired for the data preparation phase.

While such an approach may result in a reduced amount data resources for the data preparation phase (e.g., as no remote data resources of the remote resources 201, 202, and 203 are acquired for use in the data preparation phase), delayed acquisition of remote resources by the computing system 100 may improve overall resource utilization. To illustrate, static/non-hybrid resource acquisition approach would require acquisition of the total resources (both local and remote) for all phases of an EDA procedure prior to execution, including both the data preparation phase and execution phase. Present static resource acquisition techniques may be unable to effectively separate acquisition of remote compute resources from remote data resources (and thus, both data and compute resources must be reserved together).

The data preparation phase, however, may have relatively low computational requirements. As such, remote compute resources of the remote resources 201, 202, and 203 acquired for the data preparation phase would be largely unused or underutilized during the data preparation phase. Moreover, remote resources statically reserved and unused during the data preparation phase would be unavailable for use by other EDA procedures or EDA applications concurrently executing in the computing environment 200. Accordingly, such static/non-hybrid resource acquisition approaches for performance of EDA procedures may result in resource inefficiencies, and technical problem that affects static compute and data resource reservations specifically for execution of EDA procedures.

By limiting resource usage of the data preparation phase of an EDA procedure to local resources of the computing system 100, the EDA hybrid performance features provided herein may address the computational resource inefficiencies described above. That is, the EDA executor engine 110 may delay remote resource acquisition until the execution phase of the EDA procedure, during which increased computational capabilities of remote resources may be more fully utilized for circuit analysis, test, verification, or design. By flexibly acquiring resources during different phases of the EDA procedure, the EDA hybrid performance features described herein may provide various technical benefits in execution of EDA procedures. Acquired remote resources subsequently acquired may be used at near optimal efficiency, without the underutilization periods that trouble static resource reservation techniques.

Continuing the illustration shown in FIG. 2, the EDA data constructor engine 108 may perform the data preparation phase of an EDA procedure for the circuit design 205 to construct the constructor data 210. The constructor data 210 may include, for example, processed circuit data structures (e.g., hierarchical datasets) for use in the execution phase of the EDA procedure. Upon completion of the data preparation phase, the EDA executor engine 110 may then acquire remote resources that can be properly utilized for the (more computationally intense) execution phase of the EDA procedure. As such, the EDA executor engine 110 may support hybrid performance and delayed remote resource acquisition for EDA procedures.

In FIG. 2, responsive to the determination that the EDA data constructor engine 108 has completed the data preparation phase, the EDA executor engine 110 may acquire remote compute resources and remote data resources from the remote resources 201, 202, and 203 for performance of the execution phase of the EDA procedure. To do so, the computing system 100 (e.g., via the EDA executor engine 110) may implement, utilize, or otherwise support dynamic resource allocation as described in U.S. patent application Ser. No. 15/873,827 filed on Jan. 17, 2018 and titled "DYNAMIC DISTRIBUTED RESOURCE MANAGEMENT" (the '827 application), which is incorporated herein by reference in its entirety. Local or remote resources used and allocated by the computing system 100 may be maintained and allocated according to the various dynamic allocation mechanisms as described in the '827 application.

To further support the execution phase, the EDA executor engine 110 may also broadcast the constructor data 210 constructed from the data preparation phase of the EDA procedure to acquired remote resources. As shown in FIG. 2, the EDA executor engine 110 transmits the constructor data 210 to the remote resources 201, 202, and 203. The EDA executor engine 110 may further manage performance of the execution phase of the EDA procedure by the acquired remote resources 201, 202 and 203. For instance, the EDA executor engine 110 may assign different EDA operations for execution by each of the remote resources 201, 202, and 203 respectively. As another example, the EDA executor engine 110 may send a different portion of a hierarchical dataset constructed during the data preparation phase to each of the remote resources 201, 202, and 203 for each to respectively operate on during the execution phase.

In any of the various ways described above, the computing system 100, EDA data constructor engine 108, and EDA executor engine 110 may support hybrid performance of EDA procedures with delayed acquisition of resource resources. Some example timings for EDA hybrid performance are described next in FIG. 3.

Figure 3:
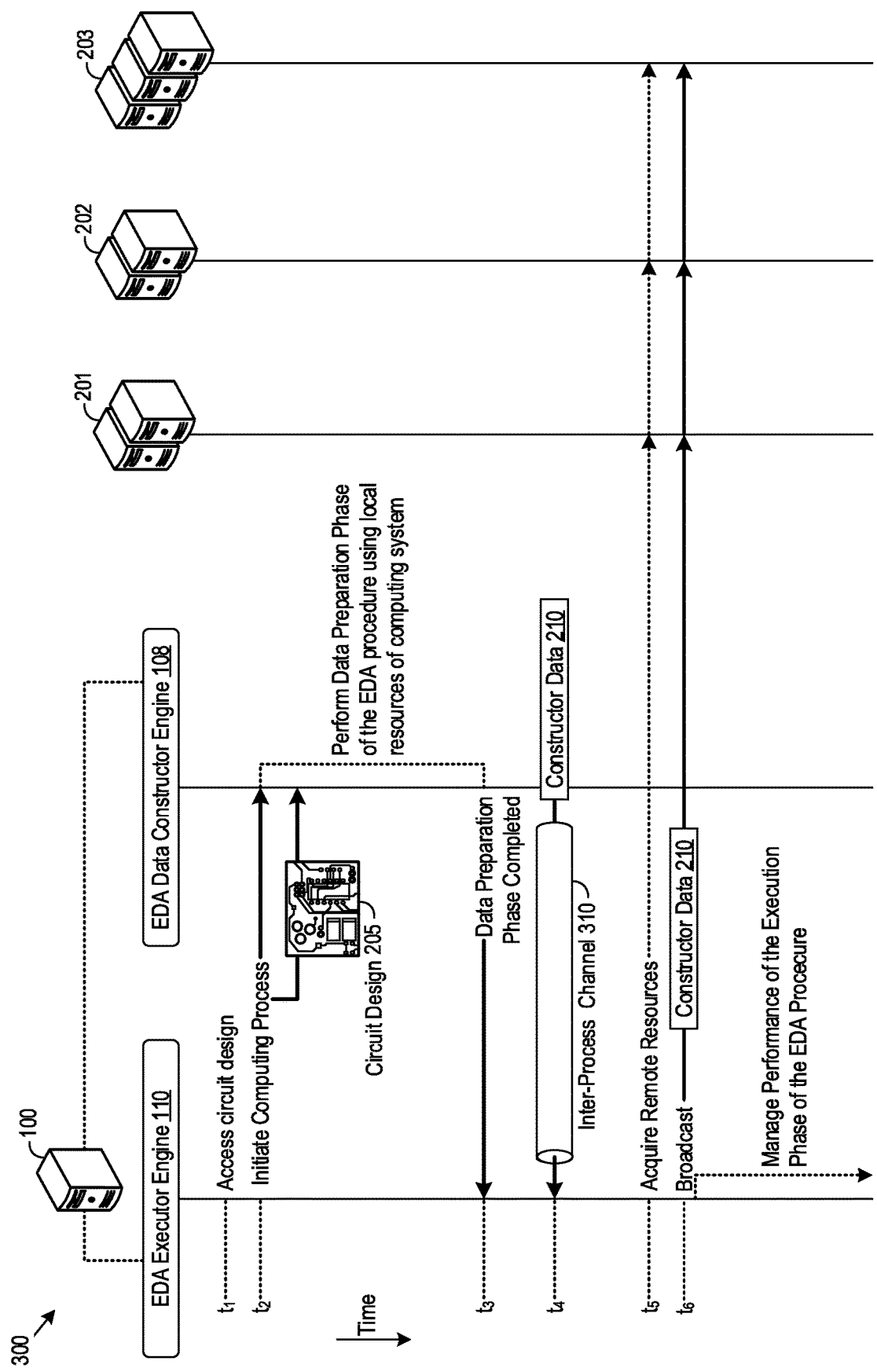
FIG. 3 shows an example of a timing sequence for hybrid performance of EDA procedures with delayed acquisition of remote resources.

FIG. 3 shows an example of a timing sequence 300 for hybrid performance of EDA procedures with delayed acquisition of remote resources. The timing sequence 300 may provide an example order of events in which various entities of a computing environment (e.g., the computing environment 200) interact to support hybrid performance of EDA procedures with delayed acquisition of remote resources. In the particular example shown in FIG. 3, the timing sequence 300 diagrams the interactions between entities of the computing environment described in FIG. 2, including the EDA data constructor engine 108 and the EDA executor engine 110 (together which are implemented via the computing system 100) as well as remote resources 201, 202, and 203.

At a time ti, the EDA executor engine 110 may access a circuit design 205. The EDA executor engine 110 may access the circuit design 205 as part of performance of an EDA procedure, for instance as initiated by a user command or scheduled execution. In some examples, the computing system 100 initiates the EDA executor engine 110 in the form of the parent computing process (and applicable hardware resources) to manage performance of the EDA procedure. As noted herein, the EDA procedure may include a data preparation phase and an execution phase.

At a time t2, the EDA executor engine 110 may initiate a separate (e.g., child) computing process to perform the data preparation phase of the EDA procedure. In particular examples, the EDA executor engine 110 may initiate the EDA data constructor engine 108 in the form of the separate computing process (and applicable hardware resources), specifically limiting resource usage assigned to the separate computing process to local resources of the computing system 100. The EDA data constructor engine 108 may also receive the circuit design 205 from the EDA executor engine 110, and perform the data preparation phase for the EDA procedure on the circuit design 205 using only local resources of the computing system 100.

In performing the data preparation phase, the EDA data constructor engine 108 may process the circuit design 205 using local memories of the computing system 100. For instance, the EDA data constructor engine 108 may store processed or constructed layout data, hierarchical datasets, or other circuit data structures in the local RAM of the computing system 100, thus performing the data preparation phase without access, use, or reservation of remote resources (which would require reservation of both remote compute and remote data resources). As noted above, such local performance of the data preparation phase may, in effect, increase resource utilization as compared to static/non-hybrid resource acquisition for EDA procedures which would instead result in underutilized compute resources (e.g., idle processor time) during the data preparation phase.

At a time t3 shown in the timing sequence 300, the EDA data constructor engine 108 completes the data preparation phase. Upon completion, the EDA data constructor engine 108 may provide a completion indication to the EDA executor engine 110. Such an indication may take the form of an inter-process communication, setting of a system flag, or as various other indication forms. The EDA data constructor engine 108 may also provide the constructor data 210 constructed during the data preparation phase (e.g., a hierarchical dataset) to the EDA executor engine 110, shown in the timing sequence 300 at time t4. In the example shown in FIG. 3, the EDA executor engine 110 and EDA data constructor engine 108 use an inter-process channel 310 to communicate the constructor data 210, and in some implementations, the communication itself of the constructor data 210 serves as a completion indication from the EDA data constructor engine 108 that the data preparation phase has completed.

Responsive to a determination that the data preparation phase has completed (or responsive to reception of the constructor data 210), the EDA executor engine 110 may acquire remote resources for performance of the execution phase of the EDA procedure. In the timing sequence 300 of FIG. 3, the EDA executor engine 110 acquires computing and data resources from remote resources 201, 202, and 203 at time t5. Then at time t6, the EDA executor engine 110 broadcasts the constructor data 210 constructed from the data preparation phase to the remote resources 201, 202, and 203, whereupon the EDA executor engine 110 may manage performance of the execution phase of the EDA procedure (e.g., assign design rule check or optical proximity correction operations to the remote resources, locally perform functional and physical verifications or geometry processing, oversee circuit analyses sub-procedures, etc.).

The example in FIG. 3 shows one example of a timing sequence 300 and example implementations to support hybrid performance of EDA procedures with delayed acquisition remote resources. Other variations are contemplated herein.

Figure 4:
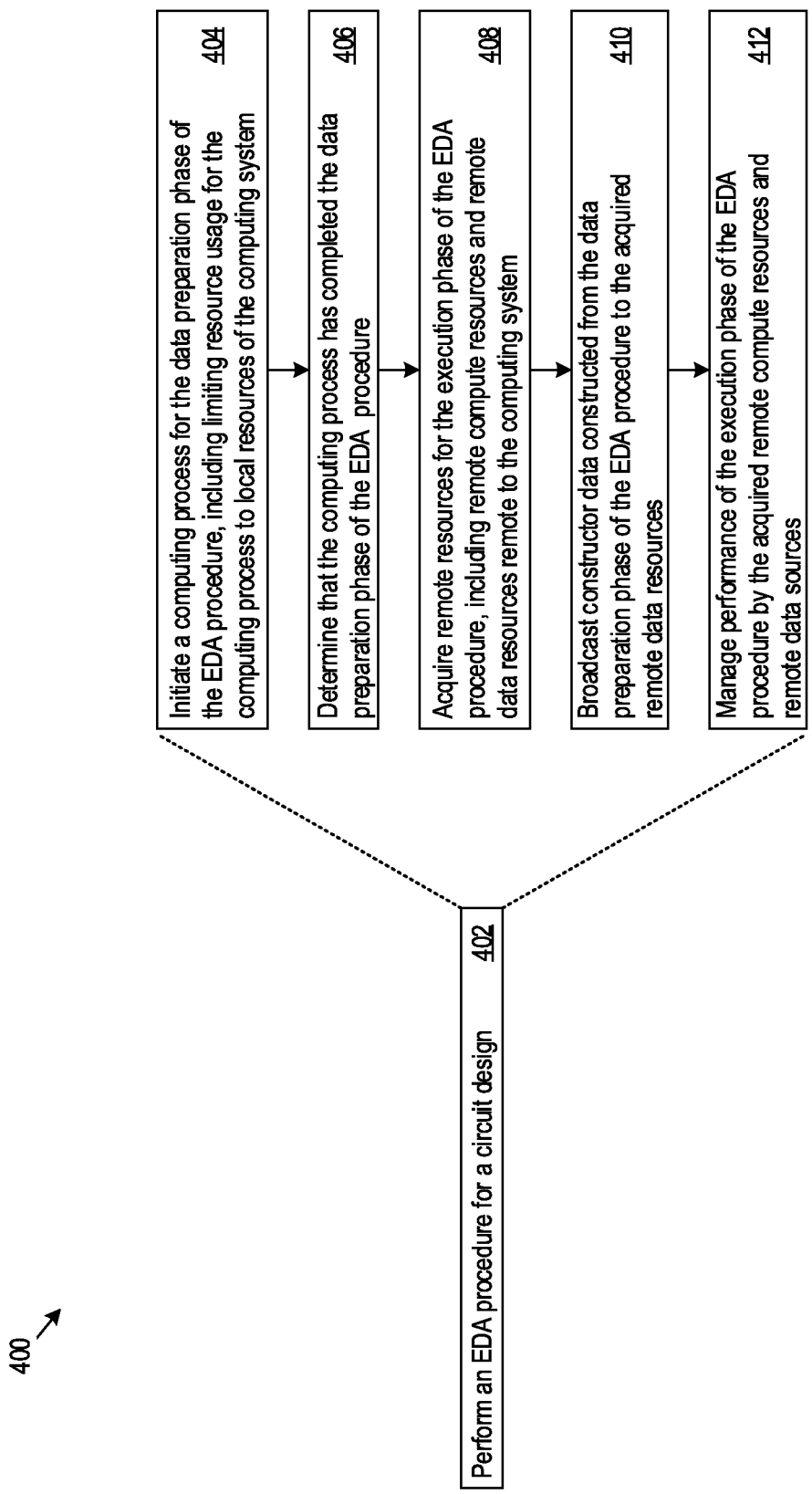
FIG. 4 shows an example of logic that a system may implement to support hybrid performance of EDA procedures with delayed acquisition of remote resources.

FIG. 4 shows an example of logic 400 that a system may implement to support hybrid performance of EDA procedures with delayed acquisition of remote resources. In some examples, the computing system 100 may implement the logic 400 as hardware, executable instructions stored on a machine-readable medium, or as a combination of both. The computing system 100 may implement the logic 400 via the EDA executor engine 110, for example, through which the computing system 100 may perform or execute the logic 400 as a method to support hybrid performance of EDA procedures with delayed acquisition of remote resources. However, other implementation options are possible.

In implementing the logic 400, the EDA executor engine 110 may perform an EDA procedure for a circuit design (402). Performance of the EDA procedure by the EDA executor engine 110 may refer to or include performing phases of the EDA procedure by the EDA executor engine 110 itself, managing/controlling performance of phases of the EDA procedure by local or remote resources, or combinations of both.

For instance, in implementing the logic 400, the EDA executor engine 110 may initiate a computing process for the data preparation phase of the EDA procedure, including limiting resource usage for the computing process to local resources of the computing system 100 (404). As noted above, the EDA executor engine 110 may initiate the computing process in the form of the EDA data constructor engine 108. The EDA executor engine 110 may further determine that the computing process has completed the data preparation phase of the EDA procedure, e.g., according to a completion indication provided by the EDA data constructor engine 108.

Responsive to the determination that the data preparation phase has completed, the EDA executor engine 110 may acquire remote resources for the execution phase of the EDA procedure, including remote compute resources and remote data resources remote to the computing system 100 (408) and broadcast constructor data constructed from the data preparation phase of the EDA procedure to the acquired remote data resources (410). Then, the EDA executor engine 110 may manage performance of the execution phase of the EDA procedure by the acquired remote compute resources and remote data resources (412).

In some implementations, the EDA executor engine 110 may terminate the initiated computing process after completion of the data preparation phase. For instance, the EDA executor engine 110 may terminate (e.g., de-initialize, close, or shutdown) the computing process (e.g., the EDA data constructor engine 108) after the constructor data has been acquired from the computing process.

In some implementations, the EDA executor engine 110 or computing system may initiate a different computing process for performing the execution phase of the EDA procedure. For instance, a parent computing process (e.g., implemented via the EDA executor engine 110) may launch another child computing process to perform the execution phase of the EDA procedure, and this execution phase child computing process may acquire the remote resources (408), broadcast the constructor data (410), and manage performance of the execution phase (412). In other implementations as described herein, the EDA executor engine 110 itself may perform these steps to perform the execution phase of the EDA procedure. In some examples, the computing system 100 may launch the parent computing process (e.g., the EDA executor engine 110), and the initiating (404), determining (406), acquiring (408), broadcasting (410), and managing (412) are performed by the parent computing process.

As yet another implementation feature, the EDA executor engine 110 may acquire the local resources of the computing system 100 for performing the data preparation phase of the EDA procedure and further maintain the local resources of the computing system 100 for the execution phase of the EDA procedure. The EDA executor engine 110 may use the maintained local resources to perform some circuit analysis operations on the constructor data constructed from the data preparation phase or to manage remote resources in performing the execution phase.

Such constructor data may include a hierarchical dataset representative of the circuit design, and the EDA executor engine 110 may broadcast portions of the hierarchical dataset to different remote data resources acquired for the execution phase of the EDA procedure (e.g., assign different cells or circuit regions of the hierarchical dataset to different remote resources for circuit analyses in the execution phase).

While example features of EDA hybrid performance with delayed acquisition of remote resources are shown and described through FIG. 4, the logic 400 may include any number of additional or alternative steps as well. The logic 400 may additionally or alternatively implement any other EDA hybrid performance features described herein, for example any with respect to the EDA data constructor engine 108, EDA executor engine 110, or combinations of both.

Figure 5:
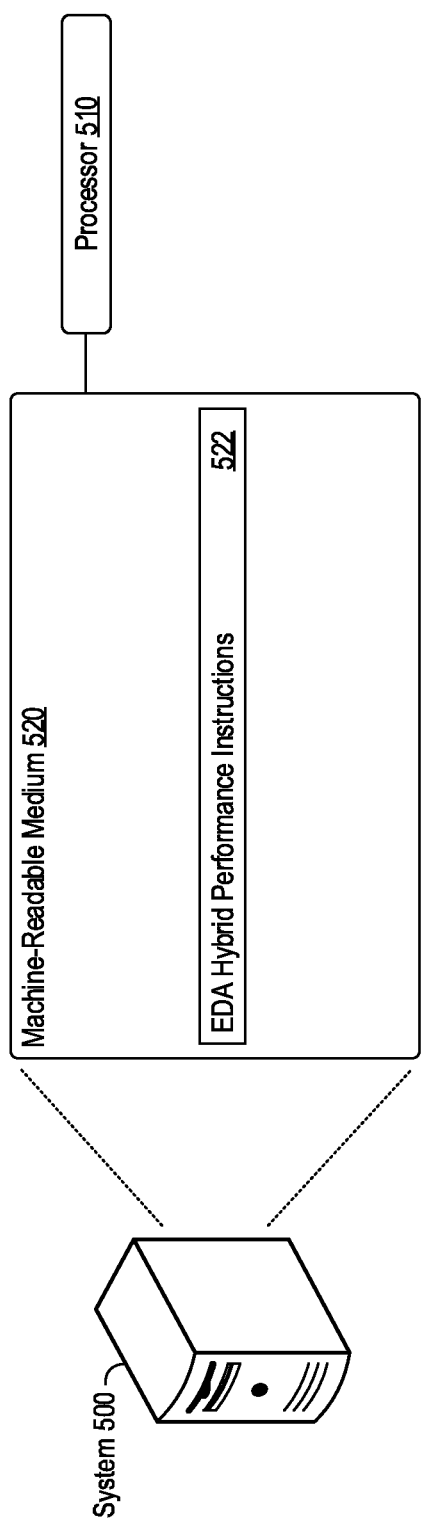
FIG. 5 shows an example of a system that supports hybrid performance of EDA procedures with delayed acquisition of remote resources.

FIG. 5 shows an example of a computing system 500 that supports hybrid performance of EDA procedures with delayed acquisition of remote resources. The computing system 500 may include a processor 510, which may take the form of a single processor or multiple processors. The processor(s) 510 may include a central processing unit (CPU), microprocessor, or any hardware device suitable for executing instructions stored on a machine-readable medium. The computing system 500 may include a machine-readable medium 520. The machine-readable medium 520 may take the form of any non-transitory electronic, magnetic, optical, or other physical storage device that stores executable instructions, such as the EDA hybrid performance instructions 522 shown in FIG. 5. As such, the machine-readable medium 520 may be, for example, random access memory (RAM) such as a dynamic RAM (DRAM), flash memory, spin-transfer torque memory, an electrically-erasable programmable read-only memory (EEPROM), a storage drive, an optical disk, and the like.

The computing system 500 may execute instructions stored on the machine-readable medium 520 through the processor 510. Executing the instructions may cause the computing system 500 to perform any of the EDA hybrid performance features described herein, including according to any of the features of the EDA data constructor engine 108, the EDA executor engine 110, combinations of both.

For example, execution of the EDA hybrid performance instructions 522 by the processor 510 may cause the computing system 500 to initiate a computing process for performance of a data preparation phase of an EDA procedure for a circuit design; limit resource usage for the computing process to local resources of the computing system, such that the data preparation phase of the EDA procedure is performed without data resources remote to the computing system; and determine that the computing process has completed the data preparation phase of the EDA procedure. Execution of the EDA hybrid performance instructions 522 may also cause the computing system 500 to, responsive to a determination that the computing process has completed the data preparation phase, acquire remote resources for an execution phase of the EDA procedure, including remote compute resources and remote data resources remote to the computing system; broadcast constructor data constructed from the data preparation phase of the EDA procedure to the acquired remote data resources; and manage performance of the execution phase of the EDA procedure by the acquired remote compute resources and remote data resources.

The systems, methods, devices, and logic described above, including the EDA data constructor engine 108 and the EDA executor engine 110, may be implemented in many different ways in many different combinations of hardware, logic, circuitry, and executable instructions stored on a machine-readable medium. For example, the EDA data constructor engine 108, EDA executor engine 110, or both, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the EDA data constructor engine 108, the EDA executor engine 110, or combinations of both.

The processing capability of the systems, devices, and engines described herein, including the EDA data constructor engine 108 and the EDA executor engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
 performing, by a computing system, an electronic design automation (EDA) procedure for a circuit design, wherein the EDA procedure includes a data preparation phase and an execution phase and the performing comprises:
  initiating a computing process for the data preparation phase of the EDA procedure, including limiting resource usage for the computing process to local resources of the computing system such that the data preparation phase of the EDA procedure is performed without data resources remote to the computing system;
  determining that the computing process has completed the data preparation phase of the EDA procedure; and
  responsive to the determination that the computing process has completed the data preparation phase:
   acquiring remote resources for the execution phase of the EDA procedure, including remote compute resources and remote data resources remote to the computing system;
   broadcasting constructor data constructed from the data preparation phase of the EDA procedure to the acquired remote data resources; and managing performance of the execution phase of the EDA procedure by the acquired remote compute resources and remote data resources.

2. The method of claim 1, wherein performing the EDA procedure further comprises, responsive to the determination that the computing process has completed:
initiating a different computing process for performing the execution phase of the EDA procedure, and wherein the acquiring, broadcasting, and managing are performed by the different computing process.

3. The method of claim 1, wherein:
the constructor data constructed from the data preparation phase comprises a hierarchical dataset representative of the circuit design; and
broadcasting the constructor data comprises broadcasting portions of the hierarchical dataset to different remote data resources acquired for the execution phase of the EDA procedure.

4. The method of claim 1, wherein performing the EDA procedure further comprises:
acquiring the local resources of the computing system for the data preparation phase of the EDA procedure; and
maintaining the local resources of the computing system for the execution phase of the EDA procedure.

5. The method of claim 1, wherein performing the EDA procedure further comprises, prior to initiating the computing process for the data preparation phase of the EDA procedure:
initiating a parent computing process for performing the EDA procedure; and
wherein the initiating, determining, acquiring, broadcasting, and managing are performed by the parent computing process.

6. The method of claim 5, wherein performing the EDA procedure further comprises, by the parent computing process:
acquiring, from the computing process, the constructor data constructed from the data preparation phase of the EDA procedure through an inter-process channel.

7. The method of claim 5, further comprising, by the parent computing process:
terminating the computing process after the constructor data has been acquired from the computing process.

8. A computing system comprising:
local resources, including local compute resources and local data resources;
an electronic design automation (EDA) data constructor engine configured to:
perform, using the local resources of the computing system, a data preparation phase of an EDA procedure for a circuit design; and
an EDA executor engine configured to:
determine that the EDA data constructor engine has completed the data preparation phase of the EDA procedure; and responsive to the determination:
acquire remote resources for an execution phase of the EDA procedure, wherein the remote resources include remote compute resources and remote data resources remote to the computing system;
broadcast constructor data constructed from the data preparation phase of the EDA procedure to the acquired remote data resources; and
manage performance of the execution phase of the EDA procedure by the acquired remote compute resources and remote data resources.

9. The computing system of claim 8, wherein the EDA executor engine is further configured to:
initialize the EDA data constructor engine to perform the data preparation phase of the EDA procedure; and
limit resource usage for EDA data constructor engine to the local resources of the computing system.

10. The computing system of claim 8, wherein:
the EDA data constructor engine is further configured to construct the constructor data for the data preparation phase to include a hierarchical dataset representative of the circuit design; and
the EDA executor engine is configured to broadcast the constructor data by broadcasting portions of the hierarchical dataset to different remote data resources acquired for the execution phase of the EDA procedure.

11. The computing system of claim 8, wherein the EDA executor engine is further configured to:
acquire the local resources of the computing system for the data preparation phase of the EDA procedure; and
keep the local resources of the computing system for performance of the execution phase of the EDA procedure.

12. The computing system of claim 8, wherein the EDA executor engine is further configured to acquire the constructor data constructed by the EDA data constructor engine for the data preparation phase through an inter-process channel.

13. The computing system of claim 8, wherein the EDA data constructor engine and the EDA executor engine are implemented, in part, as different computing processes.

14. The system of claim 8, wherein the EDA data constructor engine is configured to perform the data preparation phase of the EDA procedure without use of any resources remote to the computing system.

15. A non-transitory machine-readable medium comprising instructions that, when executed by a processor, cause a computing system to:
initiate a computing process for performance of a data preparation phase of an electronic design automation (EDA) procedure for a circuit design;
limit resource usage for the computing process to local resources of the computing system, such that the data preparation phase of the EDA procedure is performed without data resources remote to the computing system;
determine that the computing process has completed the data preparation phase of the EDA procedure; and
responsive to the determination that the computing process has completed the data preparation phase:
acquire remote resources for an execution phase of the EDA procedure, including remote compute resources and remote data resources remote to the computing system;
broadcast constructor data constructed from the data preparation phase of the EDA procedure to the acquired remote data resources; and
manage performance of the execution phase of the EDA procedure by the acquired remote compute resources and remote data resources.

16. The non-transitory machine-readable medium of claim 15, wherein the instructions, when executed by the processor, further cause the computing system to:
initiate a different computing process for performing the execution phase of the EDA procedure, and wherein acquisition of the remote resources, broadcast of the constructor data, and management of the performance of the execution phase of the EDA procedure are performed by the different computing process.

17. The non-transitory machine-readable medium of claim 15, wherein:

the constructor data constructed from the data preparation phase comprises a hierarchical dataset representative of the circuit design; and the instructions, when executed by the processor, cause the computing system to broadcast the constructor data by broadcasting portions of the hierarchical dataset to different remote data resources acquired for the execution phase of the EDA procedure.

18. The non-transitory machine-readable medium of claim 15, wherein the instructions, when executed by the processor, further cause the computing system to:

acquire the local resources of the computing system for the data preparation phase of the EDA procedure; and maintain the local resources of the computing system for the execution phase of the EDA procedure.

19. The non-transitory machine-readable medium of claim 15, wherein the instructions, when executed by the processor, further cause the computing system to:

initiate a parent computing process for performing the EDA procedure; and wherein initiation of the computing process, limiting of the resource usage, determination that the computing process has completed the data preparation phase, acquisition of the remote resources, broadcast of the constructor data, and management of the performance of the execution phase of the EDA procedure are performed by the parent computing process.

20. The non-transitory machine-readable medium of claim 19, wherein the instructions, when executed by the processor, further cause the computing system to:

acquire, from the computing process and by the parent computing process, the constructor data constructed from the data preparation phase through an inter-process channel.

* * * * *